US008865615B2

(12) United States Patent
Ito et al.

(10) Patent No.: US 8,865,615 B2
(45) Date of Patent: Oct. 21, 2014

(54) AMMONIA OXIDATION CATALYST, EXHAUST GAS PURIFICATION DEVICE USING SAME, AND EXHAUST GAS PURIFICATION METHOD

(75) Inventors: Tomoaki Ito, Shizuoka (JP); Toshinori Okajima, Shizuoka (JP); Makoto Nagata, Shizuoka (JP)

(73) Assignee: N.E. Chemcat Corporation, Tokyo (JP)

( * ) Notice: Subject to any disclaimer, the term of this patent is extended or adjusted under 35 U.S.C. 154(b) by 0 days.

(21) Appl. No.: 14/008,460

(22) PCT Filed: Nov. 17, 2011

(86) PCT No.: PCT/JP2011/076490
§ 371 (c)(1),
(2), (4) Date: Nov. 8, 2013

(87) PCT Pub. No.: WO2012/132095
PCT Pub. Date: Oct. 4, 2012

(65) Prior Publication Data
US 2014/0065044 A1 Mar. 6, 2014

(30) Foreign Application Priority Data

Mar. 31, 2011 (JP) ................................. 2011-077177

(51) Int. Cl.
B01J 21/00 (2006.01)
B01J 21/04 (2006.01)
(Continued)

(52) U.S. Cl.
CPC ............. B01J 35/0006 (2013.01); B01J 23/42 (2013.01); *B01D 2255/1021* (2013.01); *B01D*
(Continued)

(58) Field of Classification Search
CPC ............ B01J 21/00; B01J 21/04; B01J 21/06; B01J 21/08; B01J 21/12; B01J 23/00; B01J 23/10; B01J 23/30; B01J 23/40; B01J 23/42; B01J 23/63; B01J 23/64; B01J 23/652

USPC ......... 502/262–263, 304, 305, 308, 309, 313, 502/326, 327, 332–334, 339, 349–351, 407, 502/415, 439, 527.12, 527.13
See application file for complete search history.

(56) References Cited

U.S. PATENT DOCUMENTS 5,153,549 A * 10/1992 Morinaga ..................... 336/177
5,679,313 A    10/1997 Nojima et al.
(Continued)

FOREIGN PATENT DOCUMENTS

JP     07-289897 A    11/1995
JP     07-328438 A    12/1995
(Continued)

OTHER PUBLICATIONS

Ueshima, M., et al., "New Technology for Selective Catalytic Oxidation of Ammonia to Nitrogen", Res. Chem. Intermed., May 1998, vol. 24, No. 2, pp. 133-141.
(Continued)

*Primary Examiner* — Cam N. Nguyen
(74) *Attorney, Agent, or Firm* — Westerman, Hattori, Daniels & Adrian, LLP

(57) ABSTRACT

Ammonia oxidation catalyst being superior in heat resistance and capable of suppressing by-production of $N_2O$ and leakage of ammonia. The ammonia oxidation catalyst (AMOX) removes surplus ammonia, in selectively reducing nitrogen oxides by adding urea or ammonia and using a selective catalytic reduction (SCR) catalyst, into exhaust gas, wherein the ammonia oxidation catalyst is made by coating at least two catalyst layers having a catalyst layer (lower layer) including a catalyst supported a noble metal element on a composite oxide (A) having titania and silica as main components, and a catalyst layer (upper layer) including a composite oxide (C) consisting of tungsten oxide, ceria, and zirconia, at the surface of an integral structure-type substrate, wherein a composition of the composite oxide (C) is tungsten oxide: 1 to 50% by weight, ceria: 1 to 60% by weight, and zirconia: 30 to 90% by weight.

7 Claims, 3 Drawing Sheets

(51) Int. Cl.
*B01J 23/00* (2006.01)
*B01J 23/02* (2006.01)
*B01J 23/10* (2006.01)
*B01J 23/40* (2006.01)
*B01J 23/42* (2006.01)
*B01J 23/44* (2006.01)
*B01J 23/56* (2006.01)
*B01J 20/00* (2006.01)
*B01D 53/94* (2006.01)
*B01J 23/30* (2006.01)
*B01J 23/652* (2006.01)
*B01J 35/00* (2006.01)

(52) U.S. Cl.
CPC  2255/30 (2013.01); *B01D 2255/40* (2013.01); *B01D 53/9477* (2013.01); *B01D 2255/9022* (2013.01); *B01J 23/30* (2013.01); *Y02C 20/10* (2013.01); *B01D 2255/20715* (2013.01); *B01D 2255/20707* (2013.01); *B01D 2255/20776* (2013.01); *B01D 53/9436* (2013.01); *B01J 23/6527* (2013.01); *B01D 2255/2065* (2013.01); *B01D 2255/407* (2013.01); *Y10S 502/52712* (2013.01); *Y10S 502/52713* (2013.01)
USPC ........... 502/262; 502/263; 502/304; 502/305; 502/308; 502/309; 502/313; 502/326; 502/327; 502/332; 502/333; 502/334; 502/339; 502/349; 502/350; 502/351; 502/407; 502/415; 502/439; 502/527.12; 502/527.13

(56) References Cited

U.S. PATENT DOCUMENTS

| | | | |
|---|---|---|---|
| 7,541,310 B2 * | 6/2009 | Espinoza et al. | 502/326 |
| 7,601,670 B2 * | 10/2009 | Yasuda et al. | 502/326 |
| 7,879,759 B2 * | 2/2011 | Augustine et al. | 502/350 |
| 7,927,551 B2 * | 4/2011 | Miyairi et al. | 422/168 |
| 7,968,492 B2 * | 6/2011 | Augustine | 502/350 |
| 8,119,558 B2 * | 2/2012 | Wagner et al. | 502/241 |
| 8,148,295 B2 * | 4/2012 | Augustine | 502/350 |
| 8,617,502 B2 * | 12/2013 | Augustine et al. | 423/239.1 |
| 8,673,809 B2 * | 3/2014 | Nakatsuji et al. | 502/327 |
| 2008/0038174 A1 | 2/2008 | Mori et al. | |
| 2011/0230338 A1 * | 9/2011 | Augustine | 502/304 |

FOREIGN PATENT DOCUMENTS

| | | |
|---|---|---|
| JP | 10-005591 A | 1/1998 |
| JP | 2002-502927 A | 1/2002 |
| JP | 2004-524962 A | 8/2004 |
| JP | 2005-238195 A | 9/2005 |
| JP | 2007-504945 A | 3/2007 |
| JP | 2008-264703 A | 11/2008 |
| JP | 2008-279334 A | 11/2008 |
| JP | 2008-296107 A | 12/2008 |
| JP | 2009-291764 A | 12/2009 |
| JP | 2010-209783 A | 9/2010 |

OTHER PUBLICATIONS

International Search Report dated Dec. 20, 2011, issued in corresponding application No. PCT/JP2011/076490.

* cited by examiner

AMMONIA OXIDATION CATALYST, EXHAUST GAS PURIFICATION DEVICE USING SAME, AND EXHAUST GAS PURIFICATION METHOD

TECHNICAL FIELD

The present invention relates to an ammonia oxidation catalyst, and an exhaust gas purification apparatus and an exhaust gas purification method using the same, and in more detail, the present invention relates to the ammonia oxidation catalyst, which is capable of effectively suppressing by-production of $N_2O$ and leakage of ammonia, is superior in heat resistance, has small pressure drop and is capable of reducing usage of a noble metal, even under high space velocity (it may also be referred to as SV), in purifying nitrogen oxides (NO or $NO_2$) discharged from a lean-burn engine such as a boiler, a gas turbine, a lean burn-type gasoline engine, or a diesel engine, by spray supplying urea water or ammonia water, as a reducing component, onto a selective catalytic reduction; and the exhaust gas purification apparatus and the exhaust gas purification method using the same.

BACKGROUND ART

In exhaust gas discharged from a lean-burn engine such as a boiler, a gas turbine, a lean burn-type gasoline engine, or a diesel engine, various harmful substances derived from fuel or combustion air are contained depending on a structure and a type thereof. Such harmful substances include a hydrocarbon (HC), a soluble organic fraction (it may also be called SOF), soot, carbon monoxide (CO), and nitrogen oxides ($NO_x$), and they are regulated by the Air Pollution Control Law. In addition, as a purification method thereof, there has been practically used a contact treatment method for purifying exhaust gas by making it contacted with a catalyst.

In addition, in such a lean-burn engine, there may be the case where generation amount of the harmful substances such as CO and THC, which are incomplete combustion substances, is controlled by controlling combustion temperature, by operation such as supplying air of optimum amount for combustion, depending on kinds or supply amount of fuel; while, there may also be the case of incurring generation of $NO_x$ by increased combustion temperature. Such a state is similar also in an internal combustion engine, and in the case of a diesel engine, because of having a structure for operating an engine by lean-combustion, the nitrogen oxides are easily discharged. Among them, in the case where a diesel engine loaded on an automobile, because operation condition thereof is always changing, it was extremely difficult to suitably suppress generation of the harmful substances.

As a purification method of the harmful substances discharged in this way, such a method has been widely investigated that installs a catalyst at an exhaust gas passage. There has been proposed an oxidation catalyst aiming at purification of mainly SOF components and a catalyst aiming at oxidizing and purifying unburned gas components; or a catalyst system for trapping, oxidizing and purifying the soot component, in combining them with a filter; although the catalyst to be used differs depending on the harmful components discharged from an engine, or an exhaust gas regulation. In these catalysts, a noble metal such as mainly Pt or Pd has been used to promote an oxidation reaction. Because the diesel engine has relatively larger displacement and more exhaust gas amount flown out, as compared with a gasoline engine or the like, volume of the catalyst also necessarily becomes larger, and amount of the noble metal to be used becomes more, to obtain sufficient purification performance, as compared with a catalyst for a gasoline engine or the like. A catalyst for the gasoline engine, where regulations of exhaust gas from an automobile have preceded, has also used the noble metal components conventionally, and accompanying with strengthening of exhaust gas regulations for the diesel engine, such a situation has appeared that a relatively rare and expensive noble metal, among resources on the earth, has been used more and more.

Additionally, accompanying with the exhaust gas regulation of $NO_x$, a catalyst system using a $NO_x$ storage catalyst or a selective catalytic reduction (hereafter it may also be referred to as SCR) catalyst has also been proposed, as a $NO_x$ purification catalyst. As for the SCR catalyst, several types of reducing agents to be used for purification of $NO_x$ have been known, and in the SCR, where the $NH_3$ component is used as a reducing agent, $NO_x$ is finally reduced to $N_2$ mainly by the following reaction formulas (1) to (3):.

$$4\ NO + 4NH_3 + O_2 \rightarrow 4\ N_2 + 6\ H_2O \quad (1)$$

$$6\ NO_2 + 8\ NH_3 + O_2 \rightarrow 7\ N_2 + 12\ H_2O \quad (2)$$

$$NO + NO_2 + 2\ NH_3 \rightarrow 2\ N_2 + 3\ H_2O \quad (3)$$

In a denitration catalyst system utilizing such a reaction mechanism, a gasified $NH_3$ may be used as the reducing component, however, $NH_3$ itself has irritating odor or hazardous property. Therefore, there has been proposed a system for adding urea water, as the $NH_3$ component, from the upstream of the denitration catalyst, to generate $NH_3$ by pyrolysis or hydrolysis, and expressing denitration performance by reaction of the above formulas as a reducing agent.

Reactions for obtaining $NH_3$ by decomposition of urea in this way are as follows:

$$NH_2\text{—}CO\text{—}NH_2 \rightarrow NH_3 + HCNO \quad \text{(pyrolysis of urea)}$$

$$HCNO + H_2O \rightarrow NH_3 + CO_2 \quad \text{(hydrolysis of isocyanic acid)}$$

$$NH_2\text{—}CO\text{—}NH_2 + H_2O \rightarrow 2NH_3 + CO_2 \quad \text{(hydrolysis of urea)}$$

In purification of $NO_x$ in exhaust gas, it is ideal that $NH_3$ supplied is all consumed in the above denitration reactions (1) to (3). However, in $NO_x$ purification in a vehicle loaded with a diesel engine, where transient operation condition is predicted under practical running condition, it is also predicted to use $NH_3$, which was intentionally made adsorbed on the SCR catalyst surface by supplying a surplus reducing agent than that consumed in the reaction. In this way, when exhaust gas temperature is raised abruptly by abrupt acceleration in a state that $NH_3$ is adsorbed on the SCR catalyst or the like, $NH_3$ eliminated does not contribute to the $NO_x$ purification reaction, and leaks to the downstream of the SCR catalyst (hereafter it may be referred to as slip, or $NH_3$ slip), where a risk of incurring secondary pollution has been pointed out.

As a countermeasure against such a problem, it is also considered to increase capacity of the SCR to a degree not requiring $NO_x$ purification using $NH_3$ adsorbed, however, because of limitation in loading capacity or arrangement of the catalyst in an automotive application, such countermeasures cannot be said a practical solution that simply increases catalyst capacity of the SCR.

Other than this, various catalyst technologies have been investigated, as a treatment system added with other catalysts, without using only the SCR catalyst (for example, refer to PATENT DOCUMENT 1). In addition, there has also been investigated a purification method for slipped $NH_3$ by oxidation as in the following reaction formula (4), by installing a $NH_3$ purification catalyst, where platinum (Pt), palladium (Pd), rhodium (Rh) or the like is supported on a base material such as alumina, at the latter part of the SCR, to purify $NH_3$ slipped from the SCR.

$$2NH_3 + 3/2 O_2 \rightarrow N_2 + 3H_2O \qquad (4)$$

However, because the above catalyst for purifying $NH_3$ uses a noble metal component such as platinum, palladium, or rhodium, having high oxidation performance, as a catalyst active species, there was a problem of incurring new generation of $NO_x$ components such as $N_2O$, NO, and $NO_2$ at the same time of oxidation of $NH_3$, as shown in the following reaction formulas (5) to (7).

$$2NH_3 + 5/2 O_2 \rightarrow 2NO + 3H_2O \qquad (5)$$

$$2NH_3 + 7/2 O_2 \rightarrow 2NO_2 + 3H_2O \qquad (6)$$

$$2NH_3 + 2O_2 \rightarrow N_2O + 3H_2O \qquad (7)$$

To suppress generation of such $NO_x$, there has been proposed a purification catalyst arranged with a component having $NH_3$ oxidative decomposition activity at the lower layer, and arranged with a denitration component at the upper layer (refer to PATENT DOCUMENT 5). This is also understood as a catalyst capable of not only purifying $NH_3$ by $NH_3$ oxidation but also having a role of a $NO_x$ purification reaction by reacting $NO_x$ generated by $NH_3$ oxidation of the above reaction formulas (5) to (7), with slipped $NH_3$ not yet used in the oxidation reaction. There have also been proposed a catalyst for exhaust gas purification using one or more kind of oxides selected from titanium, tungsten, molybdenum or vanadium, as a denitration component of the upper layer (refer to PATENT DOCUMENT 2); or a catalyst for ammonia oxidative decomposition catalyst using a mixed system of a Ce—Ti—$SO_4$—Zr-type component and a Fe—Si—Al oxide-type component at the upper layer (refer to PATENT DOCUMENT 3); and a purification catalyst using Fe-containing zeolite or Ce-containing zeolite at the upper layer (refer to PATENT DOCUMENT 6). Also in these catalysts having a role of $NH_3$ purification, a noble metal is used as a $NH_3$ oxidative component.

As described above, in a situation of an ever strengthening exhaust gas regulation year by year, ratio of loading an exhaust gas purification catalyst system on a vehicle has increased, and price of a noble metal has soared upwards under a situation of using a rare and expensive noble metal in a large quantity. On the other hand, a too expensive catalyst as the automotive exhaust gas purification catalyst is not practical, due to giving one factor of raising vehicle price, and thus purification technology using an inexpensive active component has been investigated, so that sufficient purification performance can be exerted by less usage of the noble metal.

There has been proposed, for example, in a catalyst system composed of a novel metal particles, a catalyst promoter component and a substrate, formation of composite micro particles in a state that a noble metal salt and a metal salt exist at the same time, inside the micelle of the catalyst, using a reversed micelle method, so that contact area between the noble metal particles and the promoter component does not decrease by sintering, by which there has been described that promoter effect, which a metal compound has, becomes exerted, and a low cost catalyst having high catalytic activity and high heat resistance can be obtained (refer to PATENT DOCUMENT 7).

In addition, there have been performed many investigations, for example, on exhaust gas catalysts using Au, as a substitution metal of a platinum group element in an automotive catalyst. There has been proposed a catalyst supported Au on a substrate consisting of a ceria-zirconia solid solution having a ceria content of 40 to 80% by weight, for example, as a exhaust gas purification catalyst consisting of an Au catalyst having high CO oxidation activity (refer to PATENT DOCUMENT 8).

Under such circumstance, there has been earnestly desired a slipped $NH_3$ purification catalyst, having also suppressing function of generation of $NO_x$, which is capable of decreasing usage of the noble metal of the catalyst aiming at purification of slipped $NH_3$, in the SCR catalyst system using the above $NH_3$ as a reducing agent.

CITATION LIST

Patent Literature

PATENT LITERATURE 1: JP-A-2004-524962
PATENT LITERATURE 2: JP-A-10-5591
PATENT LITERATURE 3: JP-A-2005-238195
PATENT LITERATURE 4: JP-A-2002-502927
PATENT LITERATURE 5: JP-A-07-328438
PATENT LITERATURE 6: JP-A-2008-279334
PATENT LITERATURE 7: JP-A-2008-264703
PATENT LITERATURE 8: JP-A-2008-296107

SUMMARY OF INVENTION

Technical Problem

In view of the above conventional problems, it is an object of the present invention to provide the ammonia oxidation catalyst, which is capable of oxidizing and purifying ammonia slipped from the selective catalytic reduction, while effectively suppressing by-production of $N_2O$, superior in heat resistance, has small pressure drop and is capable of reducing usage of a noble metal, even under high space velocity, in purifying nitrogen oxides (NO or $NO_2$) discharged from a lean-burn engine such as a boiler, a gas turbine, a lean burn-type gasoline engine, or a diesel engine, by spray supplying urea water or ammonia water, as a reducing component, onto a selective catalytic reduction; and the exhaust gas purification apparatus and the exhaust gas purification method using the same.

Solution to Problem

The present inventors have intensively studied a way to solve the above-described problems and as a result, discovered that by arranging a catalyst coated with at least two catalyst layers having a catalyst layer (lower layer) including a catalyst supported a noble metal element on a composite oxide (A) having titania and silica as main components, and a catalyst layer (upper layer) including a composite oxide (C) substantially consisting of tungsten oxide, ceria and zirconia, at the surface of an integral structure-type substrate, at the latter part of the selective catalytic reduction, in purifying the $NO_x$ components using the selective catalytic reduction catalyst and using the $NH_3$ component as the reducing agent, oxidizing and purifying slipped $NH_3$ from the selective catalytic reduction becomes possible in an equivalent level as in the case of high supported amount of the noble metal, even in the case of low supported amount of the noble metal, and have thus completed the present invention.

That is, according to a first aspect of the present invention, there is provided an ammonia oxidation catalyst (AMOX) for oxidizing and removing surplus ammonia, in selectively reducing nitrogen oxides using a selective catalytic reduction (SCR) catalyst, by adding urea or ammonia as a reducing agent of the nitrogen oxides, into exhaust gas discharged from a lean-burn engine, characterized by coating at least two catalyst layers having a catalyst layer (lower layer) including a catalyst supported a noble metal element on an inorganic base material of a composite oxide (A) having titania and silica as main components, and a catalyst layer (upper layer) including a composite oxide (C) consisting of tungsten oxide, ceria and zirconia, at the surface of an integral structure-type substrate, wherein a composition of the composite oxide (C) is tungsten oxide: 1 to 50% by weight, ceria: 1 to 60% by weight, and zirconia: 30 to 90% by weight.

In addition, according to a second aspect of the present invention, there is provided the ammonia oxidation catalyst, in the first aspect, characterized in that the composition of the composite oxide (A) is titania: 60 to 99% by weight and silica: 1 to 40% by weight.

In addition, according to a third aspect of the present invention, there is provided the ammonia oxidation catalyst, in the first or the second aspect, characterized in that the composite oxide (A) further includes one or more kind selected from zirconia or alumina, wherein the content thereof is 30% by weight or less.

In addition, according to a fourth aspect of the present invention, there is provided the ammonia oxidation catalyst, in the first aspect, characterized in that the composition of the composite oxide (C) is tungsten oxide: 3 to 30% by weight, ceria: 5 to 40% by weight, and zirconia: 50 to 90% by weight.

In addition, according to a fifth aspect of the present invention, there is provided the ammonia oxidation catalyst, in the first to the third aspect, characterized in that the noble metal element supported on the composite oxide (A) includes platinum, wherein content thereof is 0.01 to 1.0 g/L per unit volume of the integral structure-type substrate.

In addition, according to a sixth aspect of the present invention, there is provided the ammonia oxidation catalyst, in the first aspect, characterized in that a coated amount of the composite oxide (A) of the catalyst layer (the lower layer) is 10 to 120 g/L per unit volume of the integral structure-type substrate.

In addition, according to a seventh aspect of the present invention, there is provided the ammonia oxidation catalyst in the first or the fourth aspect, characterized in that a coated amount of the composite oxide (C) of the catalyst layer (the upper layer) is 30 to 150 g/L per unit volume of the integral structure-type substrate.

In addition, according to an eighth aspect of the present invention, there is provided an exhaust gas purification apparatus, in any of the first to the seventh aspects, characterized in that an oxidation catalyst (DOC) having oxidation function of nitrogen monoxide and hydrocarbons, a filter (DPF) for removing particulate matters by trapping and combusting them, a spraying means for supplying a urea aqueous solution or an ammonia aqueous solution, the selective catalytic reduction (SCR) catalyst and the ammonia oxidation catalyst (AMOX), are arranged in this order in an exhaust gas passage.

Still more, according to a ninth aspect of the present invention there is provided the exhaust gas purification apparatus, in the eighth aspect, characterized in that the selective catalytic reduction (SCR) catalyst is made by coating a catalyst layer including zeolite (D) including at least an iron element, and the composite oxide (C) consisting of tungsten oxide, ceria and zirconia, on the surface of the integral structure-type substrate.

On the other hand, according to a tenth aspect of the present invention, there is provided an exhaust gas purification method, characterized by passing the exhaust gas discharged from a lean-burn engine through the oxidation catalyst (DOC) and the filter (DPF), purifying hydrocarbon components and carbon monoxide in the exhaust gas, as well as converting many of nitrogen monoxide to nitrogen dioxide, thereafter by spray supplying the urea aqueous solution or the ammonia aqueous solution and by passing through the selective catalytic reduction (SCR) catalyst to reduce nitrogen oxides in exhaust gas, and further by passing through ammonia oxidation catalyst (AMOX) to oxidize and remove surplus ammonia, using the exhaust gas purification apparatus in the eighth aspect.

Advantageous Effects of Invention

According to the ammonia oxidation catalyst of the present invention, in the case of treating a $NH_3$ component, as a reducing agent, by selective catalytic reduction, in a wide temperature range of from low temperature to high temperature, for example, from 130 to 560° C., towards $NO_x$ in exhaust gas discharged from various kinds of lean-burn engines, it is possible to purify slipped $NH_3$, in high efficiency, and suppress by-production of $N_2O$ or generation of new NOx accompanied with oxidation of the $NH_3$, even in lower supported amount of the noble metal, as compared with conventional technology. In addition, because a harmful heavy metal such as vanadium is not contained, as a catalyst component, safety thereof is high. Still more, it can response to request for making lower fuel cost and higher output, because it can reduce the pressure drop as well.

DESCRIPTION OF EMBODIMENTS

Figure 1:
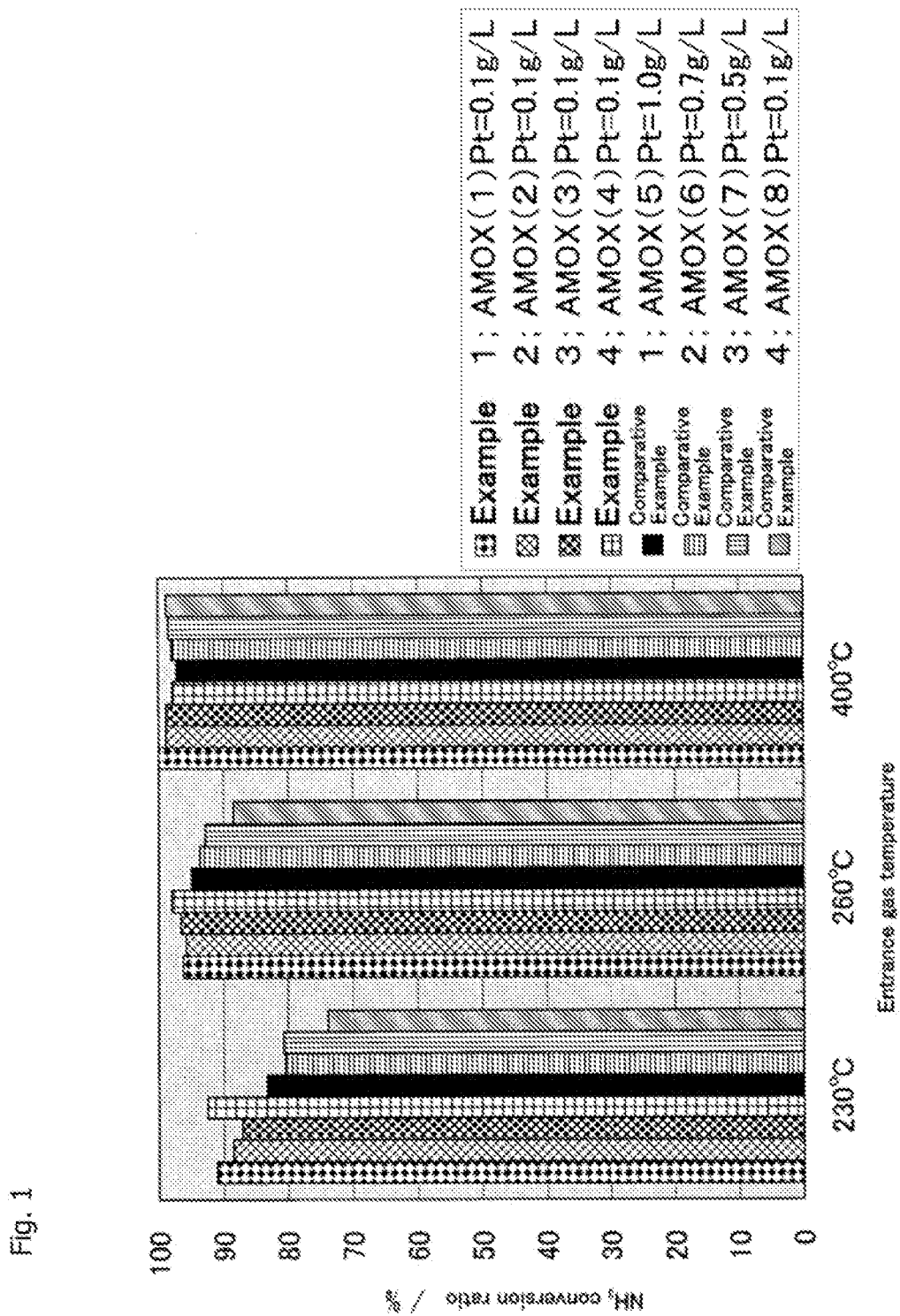
FIG. 1 is a graph representing ammonia conversion, in the case of using the ammonia oxidation catalyst of the present invention (Example) or a conventional ammonia oxidation catalyst (Comparative Example).

Explanation will be given below in detail on the ammonia oxidation catalyst of the present invention, and the exhaust gas purification apparatus and the exhaust gas purification method using the same, using mainly a diesel engine used in an automobile, as an example.

1. The Ammonia Oxidation Catalyst (AMOX)

The ammonia oxidation catalyst of the present invention (hereafter it may also be referred to as the present catalyst) is characterized by coating at least two catalyst layers having a catalyst layer (lower layer) including a catalyst supported a noble metal element on an inorganic base material of a composite oxide (A) having titania and silica as main components, and a catalyst layer (upper layer) including a composite oxide (C) consisting of tungsten oxide, ceria, and zirconia, at the surface of an integral structure-type substrate, wherein a composition of the composite oxide (C) is tungsten oxide: 1 to 50% by weight, ceria: 1 to 60% by weight, and zirconia: 30 to 90% by weight, in the ammonia oxidation catalyst (AMOX) for oxidizing and removing surplus ammonia, in selectively reducing nitrogen oxides using a selective catalytic reduction (SCR) catalyst, by adding urea or ammonia as a reducing agent of the nitrogen oxides, into exhaust gas discharged from a lean-burn engine.

(1) A Lower Catalyst Layer

In the ammonia oxidation catalyst of the present invention, the lower catalyst layer includes a catalyst supported a noble metal element on the composite oxide (A) having titania and silica as main components, and has ammonia oxidation function.

(1-1) The Noble Metal Component

In the present invention, the noble metal component is one or more kind of element selected from platinum, palladium, or rhodium. Among these, platinum has high oxidation activity and exerts superior $NH_3$ oxidation performance, therefore, it is desirable to be contained in the lower catalyst layer, as a major noble metal component. Here, the major noble metal component means a component to be contained in an amount of 50% by weight or more, relative to total amount of the noble metals to be used in the catalyst of the present invention, and all of the noble metals may be platinum.

In this case, in the case where the lower catalyst layer component of the present invention is coated on an integral structure-type substrate, usage of platinum is preferably 0.01 to 1.0 g/L and more preferably 0.02 to 0.5 g/L per unit volume of the integral structure-type substrate. The amount below 0.01 g/L makes impossible to sufficiently utilize activity of platinum, while the case of the amount over 1.0 g/L provides insufficient decreasing width of usage of the noble metal.

The catalyst component forming the lower catalyst layer exerts superior oxidation performance, in particular, when the noble metal is Pt and Pd. As described above, Pt is a catalytically active species with superior oxidation property, therefore by maintaining specific surface area thereof high, activated surface is increased and high activity can be exerted.

Accordingly, in the present invention, it is preferable that at least platinum is supported on the composite oxide (A) having titania and silica as main components. In this way, the noble metal can be supported in a highly dispersed state, as well as the noble metal component becomes difficult to be sintered, due to having high heat resistance, and thus a highly dispersed state of the noble metal can be maintained for a long period of time, in usage.

(1-2) The Composite Oxide (A)

The composite oxide (A) is an inorganic base material having titania and silica as main component, having high specific surface area and is also superior in heat resistance, and is capable of supporting the noble metal component such as platinum or the like, in a highly dispersed state.

Composition of the composite oxide (A) is preferably titania: 60 to 99% by weight, and silica: 1 to 40% by weight. The composite oxide (A) still more includes at least one or more kind selected from zirconia and alumina, and it is more preferable that at least one of zirconia and alumina occupied the composite oxide (A) is 0 to 30% by weight.

That is, in the present invention, titania and silica are essential as the composite oxide (A), and a composite oxide including at least one of zirconia or alumina, for example, an inorganic oxide, for example, titania-silica, titania-silica-zirconia, titania-silica-alumina, or titania-silica-zirconia-alumina can be used in an amount of 30% by weight or less.

Such an inorganic oxide (inorganic base material), in view of dispersibility of the noble metal component, preferably has a specific surface area (by the BET method, the same hereinafter) of 30 $m^2$/g or higher, and still more preferably 100 $m^2$/g or higher. The specific surface area of 30 $m^2$/g or higher is capable of stably supporting the noble metal in a highly dispersed state.

Supporting the noble metal on the above inorganic base material may be performed by a known method, as appropriate, by mixing hexachloroplatinic(IV) acid, diammineplatinum(II) nitrite, an ethanolamine solution of hexahydroxoplatinic(IV) acid, an aqueous solution of a metal salt such as hexachloroplatinic(IV) acid, platinumnitrate, dinitrodiammine palladium, palladium nitrate, palladium chloride, rhodium (III) chloride, or rhodium(III) nitrate, with the inorganic base material, drying and calcining or the like.

Content of the composite oxide (A) in the lower catalyst layer is desirably 10 to 120 g/L, and in particular, 15 to 100 g/L, per unit volume of the integral structure-type substrate. The reason for that is the too high content of the composite oxide (A) enhances dispersion property of Pt, which provides surplus amount of supporting, resulting in increased pressure drop or high price in some cases, while on a contrary, the too low content cannot secure dispersion degree of Pt, and cannot promote $NH_3$ oxidation, resulting in generation of $NH_3$ slip in some cases.

In addition, the lower layer to be coated on the integral structure-type substrate of the present invention may have a material having $NO_x$ purification function, other than the composite oxide (A), which is the above inorganic base material. A material having $NO_x$ purification function includes a transition metal oxide such as titania, zirconia, tungsten oxide, or ceria, a rare earth oxide of such as lanthanum oxide, praseodymium oxide, samarium oxide, gadolinium oxide, or neodymium oxide, a base metal oxide such as gallium oxide, tin oxide, or a composite oxide thereof, or the like, other than a composite oxide (C) and zeolite (D) to be described later.

(2) An Upper Catalyst Layer

In the present invention, the upper catalyst layer is composed of the composite oxide (C) consisting of tungsten oxide, ceria and zirconia, as an essential component, without including the noble metal component, and has function in which slipped $NH_3$ reacts with existing $NO_x$, that is $NO_x$ generated by oxidation of slipped $NH_3$, or $NO_x$ not sufficiently purified by the SCR catalyst, and to promote $NO_x$ purification.

(2-1) The Composite Oxide (C)

In the present catalyst, the composite oxide (C) is composed of tungsten oxide: 1 to 50% by weight, ceria: 1 to 60% by weight, and zirconia: 30 to 90% by weight, and is more preferably set so as to attain a composition of tungsten oxide: 3 to 30% by weight, ceria: 5 to 40% by weight, and zirconia: 50 to 90% by weight. Here, the tungsten oxide shall include the one existing as a simple substance of tungsten element, other than an oxide of tungsten.

As for function of each component in the composite oxide (C), for example, it is considered as follows.

Ceria has been known as a material having $NO_x$ adsorption function, and also in the present material system, has function which is capable of promoting the SCR reaction between $NH_3$ and $NO_x$, by promoting $NO_x$ adsorption.

Zirconia functions as a dispersion maintaining material to highly disperse other components in a thermally stable state.

On the other hand, the oxide of tungsten has strong acidic property and high adsorption power of urea or ammonia, which is an alkaline component, therefore by using the oxide of tungsten, denitration performance is enhanced.

In the present catalyst, a role of tungsten (W), which may exist, among others, as a tungsten oxide or also as a simple substance of a tungsten element, is important and it is preferable that interface between cerium (Ce) and W is made to have a structure for promoting a DeNOx reaction. It is because of the fact that, in evaluation of model gas purification performance of ammonia-SCR using two kinds of material powder of a W/Ce material excluding Zr, and W/Zr material excluding Ce, in a W/Ce/Zr material composing the composite oxide (C), as powder it is, without converting to a catalyst, $NO_x$ purification performance of the W/Ce material becomes higher than the W/Zr material.

This composite oxide (C) is not especially limited, as for a preparation thereof, as long as it has the above composition and structure. It may include, for example, a method for calcining a solid material obtained by dissolving a starting raw material having a form of a nitrate, a sulfate, a carbonate, an acetate, a chloride or the like, containing tungsten, cerium or zirconium, at one time into an aqueous solution, then mixing and precipitating as a precipitate, by pH adjustment or the like, or by evaporation to dryness; or a method for performing the above treatment towards a single or multiple metal salts to form an oxide, and then supporting residual metal salts all at once or sequentially.

By either producing by adding all elements at the same time, or producing powder to be a core firstly from a single or several kinds of elements, and then supporting residual elements all at once or sequentially, the composite oxide (C), containing each element in an optimum composition, can be prepared.

Coated amount of the composite oxide (C) is preferably 30 to 150 g/L and more preferably 30 to 120 g/L per unit volume of the integral structure-type substrate. The amount less than 30 g/L decreases a reaction between $NH_3$ and $NO_x$, provides insufficient SCR function, or because $NH_3$ adsorption capacity becomes small, $NH_3$, which was not able to contact with Pt at the lower catalyst layer, may slip, in some cases. On the contrary, the amount more than 150 g/L increases pressure drop or cost, and thus it is not preferable.

In addition, the upper layer of the present invention may contain a material having $NO_x$ purification function, other than the above composite oxide (C). A material having $NO_x$ purification function includes a transition metal oxide such as titania, zirconia, tungsten oxide, or ceria, a rare earth oxide of such as lanthanum, praseodymium, samarium, gadolinium, or neodymium; a base metal oxide such as gallium oxide, tin oxide, or a composite oxide thereof, or the like, other than zeolite (D) to be described later.

(3) The integral structure-type substrate

The integral structure-type substrate in the present invention is not especially limited by kind thereof. Such one can be used, beginning with a honeycomb structure-type substrate, as a sheet-like structural body knitted with a fine fiber-like material, a felt-like incombustible structural body consisting of a relatively thick fiber-like material. Among these, the honeycomb structure-type substrate is preferable, and the one coated with a catalyst component at the surface of such a honeycomb structure-type substrate may hereafter be referred to as a honeycomb structure-type catalyst, in some cases.

Kind of the honeycomb structure-type substrate is not especially limited, and it is selectable from known honeycomb structure-type substrates. As these substrates, there is included a flow-through-type substrate, a wall-flow-type substrate to be used in DPF or CSF, however, in the present invention, the flow-through-type substrate is preferable, because the present catalyst is used at the latter part of the selective catalytic reduction (SCR) aiming at only purifying slipped $NH_3$.

In addition, whole shape of such a honeycomb structured body is arbitrary, and is selectable, as appropriate, from a column-type, a square prism-type, a hexagonal prism-type or the like depending on a structure of a discharge system to be applied. Still more, proper pore number of an opening part is also determined in consideration of kind of exhaust gas to be treated, gas flow rate, pressure drop, removal efficiency or the like, however, usually it is preferable to be about 10 to 1500 pieces, in particular, 100 to 900 pieces, per 1 square inch, for purification of exhaust gas of a diesel automobile. The cell density of 10 pieces or more per 1 square inch, is capable of securing contact area between exhaust gas and the catalyst, and providing sufficient exhaust gas purification function, while the cell density of 1500 pieces or less per 1 square inch, never impairs performance of an internal combustion engine, due to no generation of significant pressure drop of exhaust gas.

In addition, as for the lower catalyst layer, in the case of using the catalyst component of the present invention by coating on a permeable structured substrate such as ceramics or the like, the component of the lower layer permeates the structured substrate, and all of or a part of the lower layer may be integrated with the structured substrate. In addition, the structured substrate may be composed of the component of the lower layer, and the component of the upper layer may be coated thereon. It should be noted that there may be the case where a bottom layer is installed between the lower layer and the structured substrate aiming at enhancing adhesion property of the catalyst layer, however, in this case, relation between the bottom layer and the lower layer is the same as relation between the above structured substrate and the lower layer.

In addition, it is preferable that such a honeycomb structure-type substrate has a cell wall thickness of 2 to 12 mil (milli-inch) and more preferably, 4 to 8 mil. In addition, a material of the honeycomb structure-type substrate includes a metal such as stainless steel, ceramics such as cordierite.

It should be noted that in the present invention, such one can also be used as a sheet-like structural body knitted with a fine fiber-like material, a felt-like incombustible structural body consisting of a relatively thick fiber-like material, however, the integral structure-type substrate different from these honeycomb structure-type substrates could increase backpressure, but may provide the case of increasing treatment capability as compared with other structure-type substrates, because of having more supported amount of the catalyst component, as well as larger contact area with exhaust gas.

In the case where components of the present catalyst are coated on the above flow-through-type honeycomb substrate, the coated amount of the upper layer is preferably 50% or more of that of the lower layer, and total coated amount of the upper layer and the lower layer is preferably 40 g/L or more, and more preferably 50 g/L or more, per unit volume, in the substrate having a hole number of the opening part of 200 to 900 pieces per 1 square inch, and a cell wall thickness of 4 to 8 mill.

It should be noted that the upper limit of the coated amount is not especially limited, as long as production cost does not rise, honeycomb holes do not clog, or backpressure of exhaust gas does not significantly increase, however, it is desirable to be held to about 230 g/L or less, and more desirable to be held at about 170 g/L or less, in the above flow-through-type honeycomb substrate. Although it depends on cell density of the substrate to be used, in the case of using the honeycomb structured body having practical cell density, performance of a combustion engine may be inhibited by increase in backpressure in some cases, when the catalyst is supported in an amount over 230 g/L.

As materials composing the lower catalyst layer and the upper catalyst layer of the present invention, other than the above materials, a solid acid, a binder or the like can also be used in combination. As such a solid acid, there is included $WO_3/ZrO_2$, $WO_3/TiO_2$, $SO_3/ZrO_2$, metallosilicate or the like, and as the binder, it is preferable to use alumina, silica, titania, silica-alumina, zirconia, and sol, gel and a solution thereof or the like.

Thickness of each layer is not especially limited, and it is enough to be, for example, 1 to 430 μm, in particular, a range of 20 to 250 μm is preferable. It is desirable that thickness of the upper layer is 40 to 250 μm, and thickness of the lower layer is 1 to 180 μm. It is allowed that thickness of each layer may be uneven, however, it is preferable that average value is within the above range. The case where each layer is too thin provides an insufficient catalyst component, and makes difficult to exert function as a layer, while the case where each layer is too thick decreases gas diffusibility and inhibits mass transfer, and thus it is not preferable.

2. A Preparation for the Ammonia Oxidation Catalyst

In order to prepare the catalyst of the present invention, firstly a lower catalyst layer material, an upper catalyst layer material and the integral structure-type substrate are prepared. The catalyst materials are produced by mixing additives such as a binder and a surfactant, as needed, with an aqueous medium to make a slurry-like mixture, and after coating it on the integral structure-type substrate, by drying and calcining it. That is, the slurry-like mixture is obtained by mixing the catalyst materials and the aqueous medium in the specified ratio. In the present invention, the aqueous medium may be used in an amount capable of dispersing each catalyst component uniformly in the slurry.

The lower catalyst layer material includes a noble metal component including at least platinum, and the composite oxide (A) having titania and silica as main components, as an inorganic base material. The noble metal component can be supported, in advance, on the inorganic base material. Slurry is prepared, in advance, by mixing the metal catalyst components and the inorganic base material in the aqueous medium.

In preparing the lower catalyst layer material, in the case of supporting the noble metal, in advance, on the inorganic base material, a known method can be adopted, as appropriate, and one example thereof will be shown as follows.

Firstly, as a raw material of the noble metal component, it is prepared as a compound such as a nitrate, a sulfate, a carbonate, or an acetate, specifically as hexachloroplatinic (IV) acid, diamminedinitroplatinum (II), an ethanolamine solution of hexahydroxoplatinic (IV) acid, tetrachloroplatinic (II) acid, platinum nitrate, diamminedinitropalladium, palladium nitrate, palladium chloride, rhodium (III) chloride, or rhodium (III) nitrate. By selecting the raw material of the noble metal component from these, and dissolving it into water or an organic solvent, a solution is prepared. It should be noted that water or a solvent made by adding a water-soluble organic solvent into water will hereafter be referred to as an "aqueous medium".

Next, the solution of this raw material of the noble metal component is mixed with the inorganic base material together with the aqueous medium, and then dried at 50 to 200° C., to remove the solvent, and then calcined at 300 to 1200° C. It should be noted that, other than the above components, a known catalyst material may be blended as a binder or the like. Such a known catalyst material includes alumina, silica, titania, zirconia, silica-alumina, ceria, an alkali metal material, an alkaline earth metal material, a transition metal material, a rare earth metal material, silver, a silver salt or the like, and a dispersing agent and a pH adjuster can be used, as needed, in combination.

Next, the catalyst composition is coated, as slurry-like mixture, on the integral structure-type substrate to cover the catalyst composition. The coating method is not especially limited, however, a washcoat method is preferable. After coating, by performing drying and calcining, the integral structure-type catalyst supported by the catalyst composition is obtained. It should be noted that drying temperature is preferably 100 to 300° C. and more preferably 100 to 200° C. In addition, calcining temperature is preferably 300 to 700° C. and particularly preferably 400 to 600° C. Drying time is preferably 0.5 to 2 hours, and calcining time is preferably to 1 to 3 hours. Heating can be performed using a known heating means such as an electric furnace, a gas furnace or the like.

The ammonia oxidation catalyst of the present invention is prepared after coating the lower catalyst layer material on the integral structure-type substrate, as described above, and then drying, calcining, and next by coating the upper catalyst layer material on this layer, drying and calcining. The upper catalyst layer material substantially includes the composite oxide (C) consisting of tungsten oxide, ceria and zirconia, and other than this, zeolite can be blended, as needed, as a raw material of the upper catalyst layer.

Other than this, such a method may be adopted that the lower catalyst layer material and the upper catalyst layer material are coated twice continuously by the washcoat method, and then drying and calcining at one time; or the lower catalyst layer material is coated by the washcoat method, and then drying, and coating materials of the second and the following layers thereon, and then drying, and calcining at one time.

In the case of coating the catalyst composition on the honeycomb-type integral structure-type substrate, when shape of the honeycomb is polygon, thickness of the layer may become different depending on the portion of the honeycomb in some cases, however, it is preferable that the thickness is within a range of 1 to 250 μm, and in particular, within a range of 20 to 250 μm, at both the upper layer and the lower layer in substantially most of the portions.

When the upper layer is too thin and below 5 μm, previous gas diffusibility may decrease in some cases, and when the total layer is too thick and over 430 μm, load to an engine is worried caused by increase in pressure drop. Particularly preferable thickness is 40 to 250 μm for the upper layer, and 1 to 180 μm for the lower layer.

3. The Exhaust Gas Purification Catalyst Apparatus and the Purification Method Using the Same In the present invention, the exhaust gas purification catalyst apparatus is composed by arranging the oxidation catalyst (DOC) having oxidation function of nitrogen monoxide and hydrocarbons, the filter (DPF) for removing particulate matters by trapping and combusting them, a spraying means for supplying a urea aqueous solution or an ammonia aqueous solution, the selective catalytic reduction (SCR) catalyst and the above ammonia oxidation catalyst (AMOX), in this order, in an exhaust gas passage.

A diesel engine has relatively low exhaust gas temperature as compared with a gasoline engine, due to structural characteristics thereof, and the temperature is from about room temperature to 700° C. In particular, in startup or at low load, exhaust gas temperature is low. However, in the case where the exhausted gas temperature is low, also catalyst temperature does not increase sufficiently, purification performance is not exerted sufficiently, and $NO_x$ in exhaust gas is not purified sufficiently and tends to be discharged easily.

In purification of $NO_x$ in exhaust gas, it is desirable that $NO_x$ is contacted with the SCR catalyst in a state that ratio of NO and $NO_2$ in exhaust gas is 1:1. It is because reaction rate of the above denitration reaction formula (3) is the fastest. Accordingly, the oxidation catalyst (DOC) for oxidizing HC and CO in exhaust gas, or the filter (DPF) for trapping combustible particulate components included in exhaust gas is arranged, as an NO oxidation means, at the first part of the present catalyst, relative to exhaust gas flow.

As the oxidation catalyst, such a catalyst can be used that has activated alumina, in which at least one kind from known platinum or palladium is supported, as a main component. It should be noted that as a substrate of the oxidation catalyst thereof, activated alumina including La can be used, and still more, a catalyst containing β-type zeolite ion exchanged with cerium may be used.

In this way, it is preferable that DOC includes a platinum component or a palladium component as the noble metal component, and amount of this noble metal component is, in a metal equivalent, preferably 0.1 to 4 g/L, and more preferably 0.5 to 3 g/L. The too high amount of the noble metal component leads to high cost, while the too low amount may not provide suitable $NO_2/No$ ratio in some cases.

In addition, it is preferable that this noble metal component contains 30 to 100% by weight of platinum, and more preferably 50 to 100% by weight of platinum in metal equivalent. In many cases, light oil to be used as fuel of a diesel automobile includes a sulfur component in 50 ppm or more, and by exhaust gas including such a sulfur component, the noble metal in the catalyst component may result in to be poisoned in some cases. Palladium tends to be easily poisoned by sulfur, while platinum tends to be little poisoned by sulfur, therefore, it is preferable that the DOC to be used in the present invention uses platinum as a main component as the noble metal component.

It should be noted that combustible particle components captured using the DPF are then combusted and removed to reproduce DPF function. In combustion of soot in the DPF, $NO_2$ is used. Combustion of soot by $NO_2$ is mild as compared with oxygen, and thus difficult to induce damage of the DPF caused by combustion heat. There is such a type of the DPF that is covered with the oxidation catalyst with an object of promoting combustion reproduction, which is called CSF. In the present invention, unless otherwise specified, the DPF shall include the CSF.

At the latter part of these DOC and DPF, the SCR catalyst is arranged. A combustion engine to which the present invention is applied includes, in the case of a diesel engine, from a compact car having about 1 L displacement to a heavy duty diesel engine having over 50 L displacement, in addition, $NO_x$ in exhaust gas discharged from such a diesel engine largely differs depending on an operating state thereof, a method for combustion control, or the like. And, also the SCR catalyst for purifying $NO_x$ in exhaust gas discharged from these diesel engines can be selected depending on versatility of displacement of the diesel engine from about 1 L to over 50 L.

In addition, as a means for purifying $NO_x$ in exhaust gas, other than the SCR, a $NO_x$ storage catalyst is used in some cases, and it is called LNT (Lean $NO_x$ Trap). $NO_x$ stored in the LNT purifies $NO_x$ using HC or CO, which is a reducing component in exhaust gas, as a reducing agent, however, the SCR may be combined with such an LNT.

In the present invention, as SCR, it is preferable to use the selective catalytic reduction (SCR) catalyst where a catalyst layer including a zeolite including at least an iron element, and a composite oxide consisting of tungsten oxide, ceria and zirconia is coated at the surface of the integral structure-type substrate. As the composite oxide, other than the composite oxide (C), which is a component of the present catalyst, a material added the silica to this composite oxide (C) can also be used. As zeolite, which is a component of this SCR catalyst, zeolite (D) to be described next is preferable.

In the present invention, zeolite (D) includes, for example, beginning with a β-type zeolite and an MFI-type zeolite having a 3D micropore structure, zeolite such as A, X, Y, MOR, CHA, or SAPO. Among them, the preferable one is the β-type zeolite or the MFI-type zeolite.

The β-type zeolite to be used preferably in the present invention has, for example, a unit cell composition represented by the following average composition formula, and is classified as synthetic zeolite of a tetragonal system:

(wherein M represents a cation species; X represents valence of the above M; m represents a number of over 0 and below 64; and p represents a number of 0 or larger).

This β-type zeolite has a relatively complex 3D micropore structure consisting of linear micropores having relatively large diameter, aligned in one direction, and a curved micropores crossing with them, and provides easy diffusion of a cation in ion exchange and diffusion of a gas molecule such as $NH_3$. In addition, such a structure is a unique structure different from that of mordenite, faujasite or the like, which has only linear voids aligned in one direction, and because of this complicated void structure, β-type zeolite is difficult to generate structural destruction caused by heat and has high stability, and thus it is an effective material for an automotive catalyst.

In general, zeolite is necessary to have an acid site which is capable of adsorbing a basic compound such as $NH_3$, however, number of the acid site differs depending on Si/Al ratio thereof. Generally, zeolite having low Si/Al ratio has more number of the acid site, and has larger degree of degradation in durability under coexistence with steam, on the contrary, zeolite having high Si/Al ratio is superior in heat resistance. In the present catalyst, because $NH_3$ adsorbs at the acid site of zeolite, which becomes an active site to reduce and remove nitrogen oxides such as $NO_2$, the one having more acid sites (the one having lower Si/Al ratio) is advantageous in view of the denitration reaction. As an index corresponding to the Si/Al ratio, molar ratio (hereafter abbreviated as SAR) of $SiO_2$ and $Al_2O_3$, obtained by composition analysis, is generally used. As described above, as for SAR, durability and activity are in a trade off relation, and in consideration of this, SAR of zeolite is preferably 15 to 300, and more preferably 17 to 60. Both the β-type zeolite and the MFI-type zeolite similarly have such characteristics.

It is preferable that zeolite including an iron element is contained, as a main component, in zeolite (D). Usually, in zeolite, as a solid acid site, a cation is present as a counter ion. As the cation, an ammonium ion or a proton is general, however, in the β-type zeolite to be used in the present catalyst, an iron element is added as the cation species, and it may be referred to as "Fe-β" in the present invention.

Reason for enhancement of action of the present invention by the β-type zeolite ion exchanged with an iron element is not certain, however, it is considered that, at the surface of zeolite, NO is oxidized to $NO_2$ to enhance reaction activity with $NH_3$, and a skeleton structure of zeolite is stabilized, and thus it contributes to enhancement of heat resistance.

The addition amount of Fe relative to zeolite is preferably 0.1 to 5% by weight, and more preferably 0.5 to 4% by weight in $Fe_2O_3$ equivalent. The amount of iron element over 5% by weight in $Fe_2O_3$ equivalent becomes not capable of securing number of the active solid acid site, and decreases activity. The amount of iron element below 0.1% by weight in $Fe_2O_3$ equivalent does not provide sufficient $NO_x$ purification performance, and decreases purification performance of exhaust gas and thus it is not preferable. It should be noted that as for the iron element added as an ion exchange species, all of them may be ion exchanged, or a part of them may be present in a state of an iron oxide.

That is, a method for supporting the iron element (hereafter it may also be referred to as a metal catalyst component) may be a method by ion exchange or impregnation. In the present invention, it is desirable that at least a part of zeolite is ion exchanged with the metal catalyst component. By suitable ion exchange, a skeleton structure of zeolite is stabilized and heat resistance of zeolite itself is enhanced. It should be noted that the metal catalyst component may not be ion exchanged completely, and a part of them may be present in a state of an oxide.

A supporting method for the iron element on zeolite is not especially limited. Such zeolite added with the iron element can be purchased from major zeolite makers as various grades, and in addition, it can be produced by a procedure described in JP-A-2005-502451 or the like. As general supporting method, there may be included, other than an ion exchange method, an impregnation method by adding zeolite, after solubilizing a nitrate salt, an acetate salt, a chloride or the like, containing an iron element, into an aqueous solution; a method for drying and calcining a precipitate, obtained by pH adjustment with an alkali or the like; or a method for evaporation to dryness, after immersing zeolite into the aqueous solution of a nitrate salt, an acetate salt, a chloride or the like, including the above iron element. Calcining temperature is preferably 300 to 800° C., and more preferably 400 to 600° C. Heating may be performed using a known heating means such as an electric furnace or a gas furnace.

As zeolite having a 3D micropore structure, which is preferable as zeolite of the present catalyst, for example, an MFI-type zeolite has also been known as the SCR component. Here, also Si/Al ratio of the MFI-type zeolite is similar as in the above β-type zeolite. The MFI-type zeolite preferably includes an iron element similarly as in the β-type zeolite. Among them, the MFI-type zeolite including an iron element may be referred to as "Fe-MFI" in some cases.

In addition, as zeolite species, in addition to the above zeolite, one or more kind of various types of zeolite such as A, X, Y, MOR, CHA, or SAPO may be used in combination.

In the case of using the present catalyst with other type of zeolite in combination, it is preferable that total ratio of the above various types of the β-type zeolite or the MFI-type zeolite is 50 to 100% in the all zeolite.

In addition, zeolite may include other transition metals, rare earth metals, or noble metals or the like, other than the above iron element. Specifically, there are included transition metals such as nickel, cobalt, zirconium, and copper; and rare earth metals such as cerium, lanthanum, praseodymium, and neodymium.

In addition, it is possible to add, as appropriate, a material generally usable as a catalyst material such as a noble metal such as gold, silver, platinum, palladium, rhodium, iridium, or ruthenium; niobium, tungsten, tantalum, ceria, a cerium-zirconium composite oxide, a lanthanum oxide, alumina, silica, zirconia, vanadia, tin, gallium; an alkali element, an alkaline earth element, or the like, within a range not to impair the object of the present invention.

In addition, composition of a material system added the silica to the composite oxide (C), is silica: 20% by weight or less: tungsten oxide: 1 to 50% by weight, ceria: 1 to 60% by weight, and zirconia: 30 to 90% by weight, and more preferably silica: 5% by weight or less: tungsten oxide: 3 to 30% by weight, ceria: 5 to 40% by weight, and zirconia: 50 to 90% by weight. In the case of the composite oxide (C), the composition is as described above. Coated amount thereof is preferably set at 10 to 80% by weight, relative to the whole catalyst layer.

In addition, in the case where the reducing agent is urea, it is desirable that the SCR catalyst contains a composite oxide (E) as a hydrolysis component of the urea component, in addition to zeolite (D) or the composite oxide (C), which is the above denitration component. It is preferable that the composite oxide (E) is a composite oxide substantially consisting of titania, silica and zirconia. In addition, it is more preferable that composition thereof is titania: 70 to 95% by weight, silica: 1 to 10% by weight and zirconia: 5 to 20% by weight.

In addition, it is preferable that coated amount of the zeolite (D), the composite oxide (C) and the composite oxide (E) as the hydrolysis component of the urea, composing the catalyst layer, is 200 to 350 g/L, and more preferably 220 to 330 g/L. The too low coated amount may not provide sufficient denitration effect in some cases, while the too high amount could decrease engine performance, caused by generation of clogging of honeycomb holes or significant increase in backpressure of exhaust gas.

In addition, it is preferable that coated amount of zeolite (D) is 10 to 80% by weight, relative to the whole catalyst layer; coated amount of the composite oxide (C) is 10 to 80% by weight, relative to the whole catalyst layer; and coated amount of the composite oxide (E) is 1 to 30% by weight, relative to the whole catalyst layer.

In addition, the SCR catalyst may be coated on the integral structure-type substrate in a one-layered structure, or may be the one coated and laminated in a two or more-layered structure. It is preferable that a catalyst layer including zeolite including at least an iron element (D), the composite oxide (C) consisting of tungsten oxide, ceria and zirconia and also being able to include silica, and the composite oxide substantially consisting of titania, silica and zirconia (E) is coated in upper and lower two layers at the surfaces of the integral structure-type substrate.

And, it is more preferable that the lower layer includes zeolite (D) in 50 to 90% by weight, the composite oxide (C) in 10 to 40% by weight, and the composite oxide (E) in 1 to 30% by weight, while the upper layer includes zeolite (D) in 10 to 40% by weight, the composite oxide (C) in 50 to 90% by weight, and the composite oxide (E) in 1 to 30% by weight. In this way, by increasing ratio of the zeolite (D) in the lower layer, and by increasing ratio of the composite oxide (C) in the upper layer, purification performance of $NO_x$ in exhaust gas can be enhanced.

In particular, it is preferable that the coated amount of the lower layer is 20 to 50% by weight of the total, and the coated amount of the upper layer is 50 to 80% by weight of the total. In this way, by increasing the coated amount of the upper layer relative to the coated amount of the lower layer, sufficiently high denitration performance can be attained. It is more preferable that the coated amount of the lower layer is 30 to 45% by weight of the total, and the coated amount of the upper layer is 55 to 70% by weight of the total.

Because the above SCR has superior denitration performance, ammonia can be more efficiently utilized as compared with a conventional catalyst.

In the present invention, at the latter part of the SCR catalyst, the present catalyst having $NH_3$ purification function is arranged. Because the present catalyst is superior in $NH_3$ purification performance, $NH_3$ slipping from the SCR catalyst can be oxidized efficiently, against exhaust gas flow.

In this way, by arranging the ammonia oxidation catalyst (AMOX) of the present invention at the latter part of the SCR catalyst, slipped $NH_3$ is oxidized and purified. Still more, by reacting $NO_x$ flown out from the SCR catalyst, or $NO_x$ generated by $NH_3$ oxidation with slipped $NH_3$ not used in the oxidation reaction, $NO_x$ purification is promoted. That is, NO and $NO_2$ in exhaust gas flow in the upper layer of AMOX, react with $NH_3$ supplied and are reduced to nitrogen, and then surplus ammonia is supplied to the upper layer of the present catalyst, and a part of which is adsorbed and held. In addition, NO passed through the upper layer and reached to the lower layer is oxidized to $NO_2$ by the noble metal component (Pt), and this $NO_2$ transfers to the upper layer, reacts with $NH_3$ adsorbed and held at the upper layer, and discharged as $N_2$ and $H_2O$. And, at the lower layer, $NO_2$ oxidized from NO by the noble metal reacts with $NH_3$ adsorbed and held at the lower layer, and discharged as $N_2$ and $H_2O$. In this way, by AMOX, purification of $NO_x$ may be still more enhanced in some cases.

According to the present invention, because of having higher performance of the $NH_3$ oxidation catalyst, when supported amount of the noble metal is the same as in conventional technology, oxidization and purification of $NH_3$ is possible from lower temperature, therefore performance of oxidization and purification of $NH_3$ equivalent to that of the conventional catalyst is obtained by less supported amount of the noble metal.

In addition, temperature of exhaust gas discharged from an automotive diesel engine varies in a wide range, and in the case where it is classified that about 150 to 250° C. is a low temperature region, as well as about 300 to 600° C. is a high temperature region, the $NH_3$ oxidation catalyst of the present invention is superior in purification activity of $NO_x$, as well as superior in heat resistance, at the low temperature region, therefore, by selecting the SCR catalyst superior in denitration performance at the high temperature region to arrange it at the first part, high denitration performance can be exerted in a wide temperature range from the low temperature region to the high temperature region.

EXAMPLES

Characteristics of the present invention will be made further clearer below by showing Examples and Comparative examples. It should be noted that the present invention should not be limited to aspects of these Examples. It should be noted that catalyst to be used in the present Examples and Comparative Examples are prepared by a method to be shown next.

Example 1

Production of a $NH_3$ oxidation catalyst AMOX (1);
=The lower layer (catalyst layer having $NH_3$ oxidation function)=
Pt-supported titania powder (0.332% by weight in Pt equivalent) was obtained by impregnating and supporting an aqueous solution of hexachloroplatinic (IV) acid as a raw material of a noble metal component, onto titania powder A (87 wt % $TiO_2$/10 wt % $ZrO_2$/3 wt % $SiO_2$) as a base material. Then, the obtained Pt-supported titania powder (1003 g) and water were put into a ball mill and milled till the specified particle size is attained to obtain slurry A for a $NH_3$ oxidation catalyst layer.

Subsequently, an integral structure-type substrate, that is, a honeycomb flow-through-type cordierite substrate (300 cells 5 mil, a diameter of 25.4 mm, a length of 24 mm), was immersed into this slurry A, and coated so as to attain a catalyst-supported amount of 30 g/L per unit volume, by a washcoat method. After that, it was dried at 150° C. for 1 hour and calcined at 500° C. for 2 hours under an air atmosphere to obtain a catalyst B already coated the lower layer.
=The Upper Layer (SCR Function Layer)=
Slurry C for an SCR function layer was obtained by putting 1000 g of a W/Ce/Zr material (10 wt % $WO_3$/23 wt % $CeO_2$/67 wt % $ZrO_2$), and 100 g of a binder, and water, into a ball mill and milling till attaining the specified particle size.

Subsequently, the above catalyst B already coated the lower layer was immersed into this slurry C, and coated so as to attain a catalyst supported amount of 110 g/L per unit volume, by a washcoat method. After that, it was dried at 150° C. for 1 hour and calcined at 500° C. for 2 hours under an air atmosphere to obtain an AMOX (1) shown in Table 1. It should be noted that numerical values of Table 1 show content of each component in parts by weight, based on the W/Ce/Zr material as 100 parts by weight.

Figure 2:
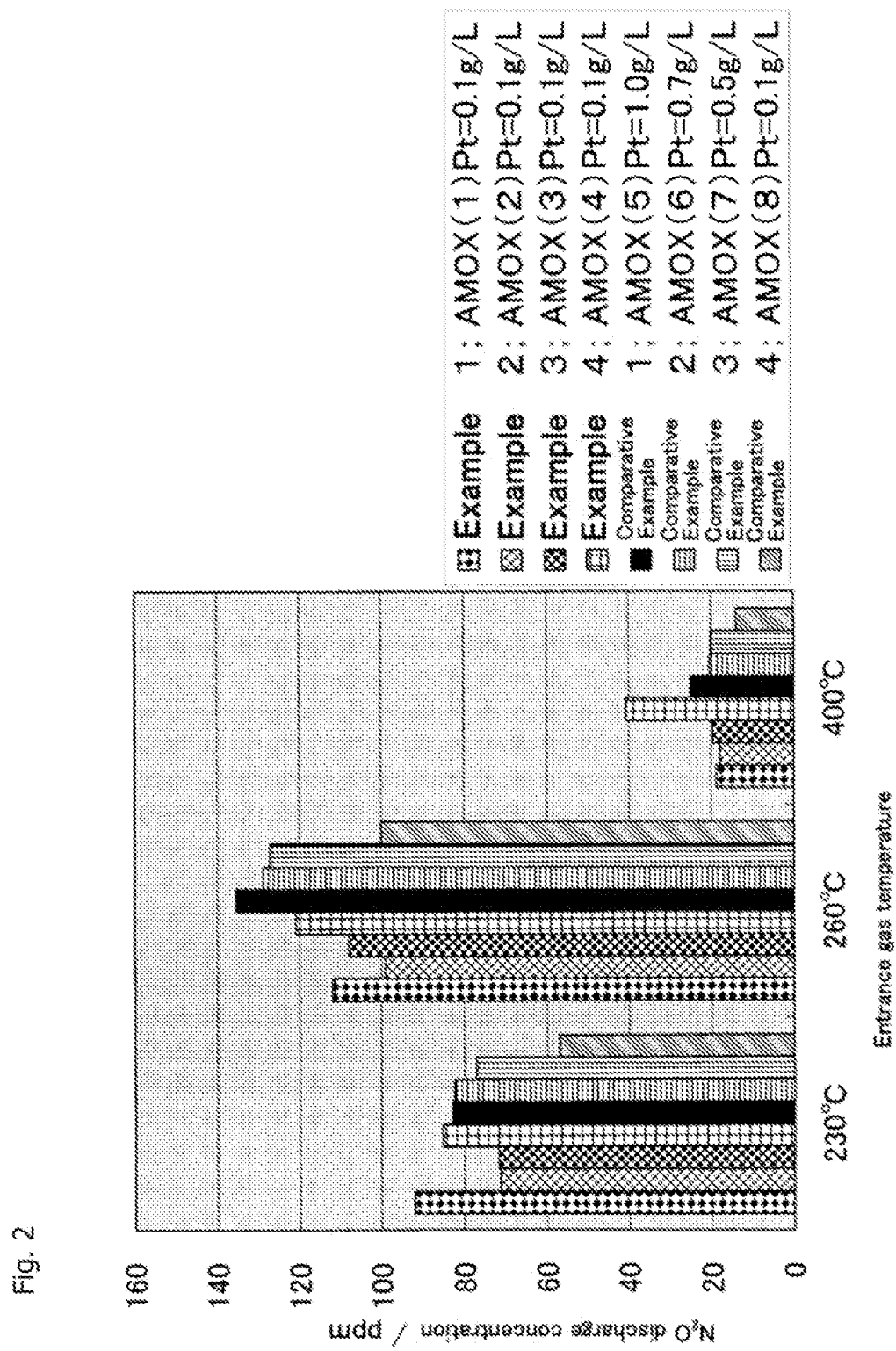
FIG. 2 is a graph representing $N_2O$ discharge concentration, in the case of using the ammonia oxidation catalyst of the present invention (Example) or a conventional ammonia oxidation catalyst (Comparative Example).
Figure 3:
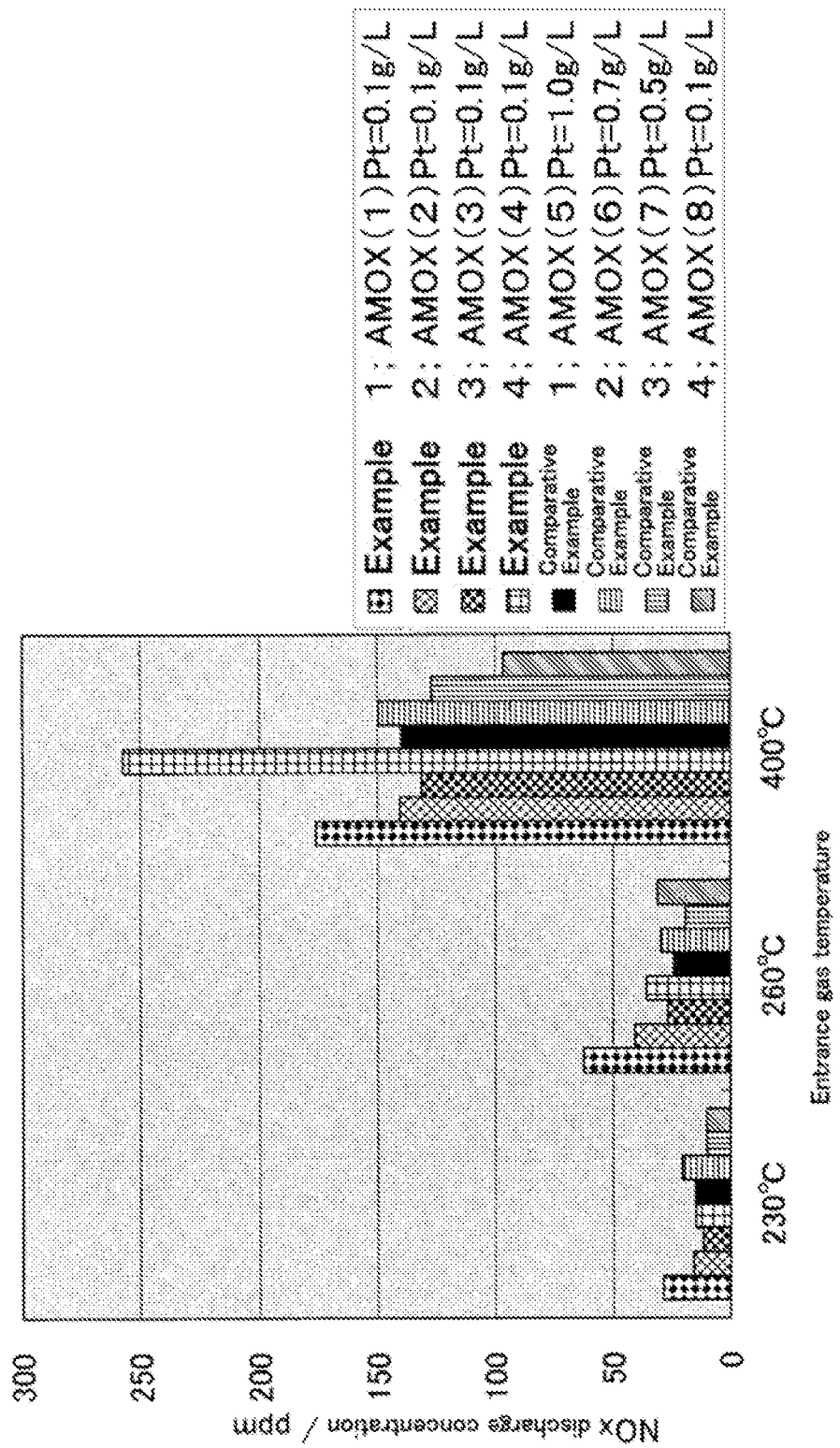
FIG. 3 is a graph representing $NO_x$ discharge concentration, in the case of using the ammonia oxidation catalyst of the present invention (Example) or a conventional ammonia oxidation catalyst (Comparative Example).

After that, using the obtained $NH_3$ oxidation catalyst, the following catalyst performance evaluation was performed. Evaluation results of this catalyst performance are shown in FIGS. 1 to 3.
<Catalyst Performance Evaluation> ($NO_x$.$NH_3$-Slip Evaluation)

Under the measurement conditions described below, gas concentrations of $NH_3$, NO, $NO_2$ and $N_2O$ at the entrance and exit of the catalyst were measured to evaluate catalyst performance of the AMOX (1), using three indexes of $NH_3$ conversion, $NO_x$ discharge concentration, and $N_2O$ discharge concentration. Results thereof are shown in FIGS. 1 to 3.

It should be noted that gas measurement was measured in the state that various gas components became stable, after the specified temperature was attained, and 20 minutes have passed after starting flow of gas with the specified concentration.

It should be noted that $NH_3$ conversion and $NO_x$ discharge concentration were calculated, based on the following formula for computation:

$NH_3$ conversion [%]=[{($NH_3$ concentration at the entrance)−($NH_3$ concentration at the exit)}/($NH_3$ concentration at the entrance)]×100

$NO_x$ discharge concentration [ppm]=(NO concentration at the exit)+($NO_2$ concentration at the exit)

<Measurement Conditions>
Evaluation equipment; Model gas test equipment (manufactured by MHI Solution Technologies, Co., Ltd.)
Quantitative analysis equipment; FTIR (NEXUS-670 with a 2 m gas cell, manufactured by Thermo Electron Co., Ltd.)
Catalyst size; φ 25.4 mm×24 mm, 300 cells/5 mill, 12.2 mL/unit
Space velocity; 100,000/h
Total gas flow rate; 20.3 L/min
Model gas composition; (refer to Table 2)

Example 2

Production of a $NH_3$ Oxidation Catalyst AMOX (2);
=The Lower Layer (Catalyst Layer Having $NH_3$ Oxidation Function)=
Pt-supported titania powder (0.332% by weight in Pt equivalent) was obtained, in a procedure described in Example 1, by impregnating and supporting an aqueous solution of platinum chloride as a raw material of a noble metal component, onto titania powder D (90 wt % $TiO_2$/10 wt % $SiO_2$) as a base material. The obtained Pt-supported titania powder and water were put into a ball mill and milled till the specified particle size is attained to obtain slurry F for a NH$_3$ oxidation catalyst layer.

Subsequently, an integral structure-type substrate, that is, a honeycomb flow-through-type cordierite substrate (300 cells 5 mil, a diameter of 25.4 mm, a length of 24 mm) was immersed into this slurry F, and coated so as to attain a catalyst supported amount of 30 g/L per unit volume, by a washcoat method, After that it was dried at 150° C. for 1 hour and calcined at 500° C. for 2 hours under an air atmosphere to obtain a catalyst G already coated the lower catalyst layer.

=The Upper Layer (SCR Function Layer)=

Slurry H for an SCR function layer was obtained by putting 1000 g of a W/Ce/Zr material (10 wt % WO$_3$/23 wt % CeO$_2$/67 wt % ZrO$_2$), and 100 g of a binder, and water, into a ball mill and milling till attaining the specified particle size.

Subsequently, the above catalyst G already coated the lower catalyst layer was immersed into this slurry H, and coated so as to attain a catalyst supported amount of 110 g/L per unit volume, by a washcoat method. After that, it was dried at 150° C. for 1 hour and calcined at 500° C. for 2 hours under an air atmosphere to obtain an AMOX (2) shown in Table 1.

After that, using the obtained NH$_3$ oxidation catalyst, catalyst performance evaluation was performed in a procedure of Example 1. Evaluation results of this catalyst performance are shown in FIGS. 1 to 3.

Example 3

Production of a NH$_3$ oxidation catalyst AMOX (3); AMOX (3) shown in Table 1 was obtained similarly as in the method described in Example 2, except by using titania powder E (80% by weight TiO$_2$/15% by weight SiO$_2$/5% by weight Al$_2$O$_3$) instead of titania powder D (90 wt % TiO$_2$/10 wt % SiO$_2$) as a base material for supporting a noble metal.

After that, using the obtained NH$_3$ oxidation catalyst, catalyst performance evaluation was performed in a procedure of Example 1. Evaluation results of this catalyst performance are shown in FIGS. 1 to 3.

Example 4

Production of a NH$_3$ Oxidation Catalyst AMOX (4);

AMOX (4) shown in Table 1 was obtained similarly as in Example 3, by changing supported amount of the catalyst at the upper layer from 110 g/L to 55 g/L.

After that, using the obtained NH$_3$ oxidation catalyst, catalyst performance evaluation was performed in a procedure of Example 1. Evaluation results of this catalyst performance are shown in FIGS. 1 to 3.

TABLE 1

AMOX catalyst composition

| Unit of numerical value [g/L] | | Pt | Composite oxide A ||| Composite oxide C | Fe zeolite | Binder |
|---|---|---|---|---|---|---|---|---|
| | | | titania powder A | titania powder D | titania powder E | W/Cw/Zr material | | |
| Example 1 AMOX (1) | upper layer | | | | | 100 | | 10 |
| | lower layer | 0.1 | 30 | | | | | |
| Example 2 AMOX (2) | upper layer | | | | | 100 | | 10 |
| | lower layer | 0.1 | | 30 | | | | |
| Example 3 AMOX (3) | upper layer | | | | | 100 | | 10 |
| | lower layer | 0.1 | | | 30 | | | |
| Example 4 AMOX (4) | upper layer | | | | | 50 | | 5 |
| | lower layer | 0.1 | | | 30 | | | |
| Comparative Example 1 AMOX (5) | upper layer | | | | | | 100 | 15 |
| | lower layer | 1.0 | | 44 | | | 30 | 10 |
| Comparative Example 2 AMOX (6) | upper layer | | | | | | 100 | 15 |
| | lower layer | 0.7 | | 44 | | | 30 | 10 |
| Comparative Example 3 AMOX (7) | upper layer | | | | | | 100 | 15 |
| | lower layer | 0.5 | | 44 | | | 30 | 10 |
| Comparative Example 4 AMOX (8) | upper layer | | | | | | 100 | 15 |
| | lower layer | 0.1 | | 44 | | | 30 | 10 |

TABLE 2

| Model gas composition | | | | | |
|---|---|---|---|---|---|
| Evaluation temperature | | ° C. | 230 | 260 | 400 |
| gas concentration | NH$_3$ | ppm | 500 | 500 | 300 |
| | NO | ppm | 0 | 0 | 150 |
| | NO$_2$ | ppm | 0 | 0 | 150 |
| | H$_2$O | % | 5 | 5 | 5 |
| | O$_2$ | % | 10 | 10 | 10 |
| | N$_2$ | | balance | balance | balance |

Comparative Example 1

Catalyst performance was evaluated similarly by setting in the model gas test equipment, using the ammonia oxidation catalyst AMOX (5) prepared by the following method, instead of the above ammonia oxidation catalyst AMOX (1). Evaluation results of this catalyst performance are shown in FIGS. 1 to 3.

Production of a NH$_3$ Oxidation Catalyst AMOX (5);

=The Lower Layer (Catalyst Layer Having NH$_3$ Oxidation Function)=

Pt-supported titania powder (2.1% by weight in Pt equivalent) was obtained by impregnating and supporting an aqueous solution of platinum chloride as a raw material of a noble metal component, onto titania powder D (90 wt % TiO$_2$/10 wt % SiO$_2$, BET value: 100 m$^2$/g) as a base material.

540 g of the obtained Pt-supported titania powder, 115 g of a β-type zeolite (Fe ion exchange amount; 1.76% by weight (in $Fe_2O_3$ equivalent), SAR=28) ion exchanged with an iron element, 230 g of an MFI-type zeolite (Fe ion exchange amount; 1.35% by weight (in $Fe_2O_3$ equivalent), SAR=23) ion exchanged with an iron element, and 115 g of a binder, and water, were put into a ball mill and milled till the specified particle size is attained to obtain slurry L for a $NH_3$ oxidation catalyst layer.

Subsequently, an integral structure-type substrate, that is, a honeycomb flow-through-type cordierite substrate (300 cells, 5 mil, a diameter of 25.4 mm, a length of 24 mm), was immersed into this slurry L, and coated so as to attain a catalyst supported amount of 85 g/L per unit volume, by a washcoat method. After that, it was dried at 150° C. for 1 hour and calcined at 500° C. for 2 hours under an air atmosphere to obtain a catalyst H already coated the lower catalyst layer. In the catalyst H already coated the lower catalyst layer obtained in this way, Pt is supported in an amount of 1.0 g/L per unit volume.

=The Upper Layer (SCR Function Layer)=

Slurry I for coating of an SCR function layer was obtained by putting 355 g of the β-type zeolite (Fe ion exchange amount; 1.76% by weight (in $Fe_2O_3$ equivalent), SAR=28) ion exchanged with an iron element, 535 g of the MFI-type zeolite (Fe ion exchange amount; 1.35% by weight (in $Fe_2O_3$ equivalent), SAR=23) ion exchanged with an iron element, 20 g of cerium oxide (BET value: 150 $m^2/g$), and 90 g of a binder, and water, into a ball mill and milling till attaining the specified particle size.

Subsequently, the catalyst H already coated the lower catalyst layer was immersed into this slurry I, and coated so as to attain a catalyst supported amount of 115 g/L per unit volume, by a washcoat method. After that, it was dried at 150° C. for 1 hour and calcined at 500° C. for 2 hours under an air atmosphere to obtain a Comparative AMOX (5) shown in Table 1. It should be noted that numerical values of Table 1 show content of each component in parts by weight, based on the Fe-zeolite as 100 parts by weight.

Comparative Example 2

An ammonia oxidation catalyst AMOX (6) was obtained similarly as the ammonia oxidation catalyst AMOX (5), except by changing noble metal concentration of the Pt-supported titania powder of the lower layer of the ammonia oxidation catalyst AMOX (5) in Comparative Example 1, so as to attain a Pt-supported amount of 0.7 g/L per unit volume of the final catalyst. Catalyst performance was evaluated by setting similarly in the model gas test equipment. Evaluation results of this catalyst performance are shown in FIGS. 1 to 3.

Comparative Example 3

An ammonia oxidation catalyst AMOX (7) was obtained similarly as the ammonia oxidation catalyst AMOX (5), except by changing noble metal concentration of the Pt-supported titania powder of the lower layer of the ammonia oxidation catalyst AMOX (5) in Comparative Example 1, so as to attain a Pt-supported amount of 0.5 g/L, per unit volume of the final catalyst. Catalyst performance was evaluated by setting similarly in the model gas test equipment. Evaluation results of this catalyst performance are shown in FIGS. 1 to 3.

Comparative Example 4

An ammonia oxidation catalyst AMOX (8) was obtained similarly as the ammonia oxidation catalyst AMOX (5), except by changing noble metal concentration of the Pt-supported titania powder of the lower layer of the ammonia oxidation catalyst AMOX (5) in Comparative Example 1, so as to attain a Pt-supported amount of 0.1 g/L, per unit volume of the final catalyst.

Evaluation

As shown in FIG. 1, Examples 1 to 4 are superior in $NH_3$ conversion at 230° C., in spite of having low Pt amount, because the ammonia oxidation catalysts AMOX (1) to (4) include a specific composite oxide, as a catalyst component of the present invention. In addition, as shown in FIG. 2, it has been understood to have low $N_2O$ discharge concentration and thus superior $N_2O$ generation suppression capability. Still more, as shown in FIG. 3, it has been understood that $NO_x$ discharge concentration compares also favorably, in spite of having low Pt amount.

On the contrary, it has been understood that in Comparative Examples 1 to 4, because the ammonia oxidation catalysts AMOX (5) to (8) do not include a specific composite oxide, different from the present invention, in spite of having more Pt amount, $NH_3$ conversion at 230° C. is low, as shown in FIG. 1; $N_2O$ discharge concentration is high and inferior in $N_2O$ generation suppression capability, as shown in FIG. 2; and $NO_X$ discharge concentration is relatively low, due to more Pt amount, as shown in FIG. 3, Industrial Applicability The present invention is widely applicable to removal technology of nitrogen oxides discharged from an automobile such as a diesel engine using light oil as fuel, and also to purification of slipped $NH_3$. In addition, it is applicable also to exhaust gas discharged from a combustion engine using, as fuel, beginning with gasoline and heavy oil, as well as bio-fuel such as alcohol, mixed fuel of bio-fuel and light oil, or mixed fuel of bio-fuel and gasoline. Still more, the present invention also exerts effect by combined use with an exhaust gas purification catalyst apparatus accompanying with reproduction of a filter deposited with combustible particle components.

The invention claimed is:

1. An ammonia oxidation catalyst (AMOX) for oxidizing and removing surplus ammonia, in selectively reducing nitrogen oxides by adding urea or ammonia as a reducing agent of the nitrogen oxides and using a selective catalytic reduction (SCR) catalyst, into exhaust gas discharged from a lean-burn engine, comprising at least two catalyst layers having a catalyst layer (lower layer) comprising a noble metal element supported on an inorganic base material of a composite oxide (A) having titania and silica as main components, and a catalyst layer (upper layer) comprising a composite oxide (C) consisting of tungsten oxide, ceria, and zirconia, at the surface of a substrate, wherein the composite oxide (C) comprises tungsten oxide: 1 to 50% by weight, ceria: 1 to 60% by weight, and zirconia: 30 to 90% by weight.

2. The ammonia oxidation catalyst according to claim 1, wherein the composition of the composite oxide (A) is titania: 60 to 99% by weight and silica: 1 to 40% by weight.

3. The ammonia oxidation catalyst according to claim 1, wherein the composite oxide (A) further comprises one or more selected from zirconia and alumina, wherein the content thereof is 30% by weight or less.

4. The ammonia oxidation catalyst according to claim 1, wherein the composition of the composite oxide (C) is tungsten oxide: 3 to 30% by weight, ceria: 5 to 40% by weight, and zirconia: 50 to 90% by weight.

5. The ammonia oxidation catalyst according to claim 1, wherein the noble metal element supported on the composite oxide (A) comprises platinum, wherein content thereof is 0.01 to 1.0 g/L per unit volume of the substrate.

6. The ammonia oxidation catalyst according to claim 1, wherein a coated amount of the composite oxide (A) of the catalyst layer (the lower layer) is 10 to 120 g/L, per unit volume of the substrate.

7. The ammonia oxidation catalyst according to claim 1 or 4, wherein a coated amount of the composite oxide (C) of the catalyst layer (the upper layer) is 30 to 150 g/L, per unit volume of the substrate.

* * * * *